United States Patent

Bruening et al.

[15] 3,641,806
[45] Feb. 15, 1972

[54] TESTING DEVICE FOR WATER METER REGISTERING UNITS

[72] Inventors: James H. Lee and David J. Bruening, both of Montgomery County, Md.

[73] Assignee: Washington Suburban Sanitary Commission

[22] Filed: Sept. 2, 1970

[21] Appl. No.: 69,061

[52] U.S. Cl...................................................................73/3
[51] Int. Cl..........................................................G01f 25/00
[58] Field of Search..........................................73/3, 194 R

[56] References Cited

UNITED STATES PATENTS 2,510,327  6/1950  Bennett........................................73/3
3,029,637  4/1962  Fellows....................................73/194 R Primary Examiner—Louis R. Prince
Assistant Examiner—William A. Henry, II
Attorney—Lavine, Cantor & Reich

[57] ABSTRACT

A testing device for testing a water meter register unit which comprises a rotatable magnet and which causes signals to be transmitted to a remote register: the testing device includes a housing for batteries, a motor and a rotatable magnet driven by the motor. The magnet is located within a chamber on which are supports for the water meter register unit. The batteries are connected to the motor through a switch in either parallel or series, and adapter rings enable the holding of register units of various sizes.

8 Claims, 4 Drawing Figures

INVENTORS
JAMES H. LEE
DAVID J. BRUENING

*Lavine, Cantor & Reich*

ATTORNEYS

INVENTORS
JAMES H. LEE
DAVID J. BRUENING

*Lavine, Cantor & Reich*
ATTORNEYS

TESTING DEVICE FOR WATER METER REGISTERING UNITS

BACKGROUND OF THE INVENTION

The present invention pertains to a device for testing a water meter register unit.

Water is supplied to consumers, such as home owners or business establishments, by conduits which lead from a supply source into the building occupied by the user. The user is required to compensate the water utility for the amount of water used, and to effect this, the water which is supplied to each user is measured, and a record made of the amount used. Typically a meter was provided within the building of the user, connected to the water inlet conduit. The meter includes a vane, or impeller which was rotated by the water which passed through a chamber within which the vane or impeller was housed. The impeller or vane was mounted on a shaft, this shaft driving, through suitable coupling, a register which registered the cumulative amount of water used. Previously, it was necessary that an employee of the water utility gain access to the interior of the user's building in order to read the register, and make a record thereof, for subsequent billing of the user by the water utility.

However, an improved water meter organization has been developed and put into use, this being a water meter organization including the following three basic units: a measuring chamber, a register unit, and a remote register unit. The measuring chamber is provided with a vane or impeller which functions in the same manner as with the older-type water meter, the shaft thereof carrying a magnet. The register unit is mounted directly on the measuring chamber, and includes a magnet which is magnetically coupled with the magnet of the measuring chamber. The magnet of the register unit is mounted on a shaft, and through suitable gearing drives the register unit, which typically includes a transparent element for permitting the registering device to be observed. In addition, the register unit includes a signal generator, which is driven by the magnet in the register unit and which generates a signal that is transmitted over a suitable signal conductor to a remote register unit; the remote register unit is positioned on the exterior of the user's building, so that the water utility employee does not have to gain access to the interior of the user's building in order to read the register unit.

Two types of signal generators are at present prominently used. One type of signal generator generates an electrical signal, in the nature of a pulse, which signal is carried by means of an insulated wire to the remote register unit, where the signal causes the remote register unit to be operated. Another type of signal generator generates a charge or pulse of compressed air, which is conducted to the remote register unit by a suitable tube or conduit. With either type of signal generator, it is necessary to insure that, upon installation of the three-part water meter apparatus, the register unit mounted on the measuring chamber operates satisfactorily, that the electric wire or tube connecting that register unit with the remote register unit is satisfactorily installed, and that the remote register unit operates satisfactorily.

Heretofore, in order to test the three-part apparatus after its installation, it was necessary to utilize the services of two employees, and to cause water to flow through the measuring chamber of the water meter apparatus. The water was caused to flow at a rate of approximately 5 gallons per minute, and in order to determine the accuracy of the components, it was necessary to cause the water to flow for approximately one-half an hour. This time was considered to be necessary in order to have enough water flow through the measuring chamber so that any deficient operation of the various system parts could be noted.

SUMMARY OF THE INVENTION

A testing device is provided including a housing of a suitable size to support a water meter register unit. In the housing are an electric motor and a pair of conventional dry cell batteries. An electric circuit is provided, including a switch, for connecting the batteries to the motor. The switch is constructed so as to connect the batteries to the motor in either series or parallel arrangement, to thereby provide for speed selection of the motor. The motor is drivingly coupled to a rotatably mounted magnet, located adjacent and beneath an accessible surface of the housing. Mounting fingers for supporting a register unit extend from the surface so that the magnet of the testing unit and the magnet of the register unit are magnetically coupled together. One or more supporting rings are provided, carried in a suitable compartment of the housing, so that register units of different sizes may be mounted upon the surface in the desired relationship.

The register unit is removed from the measuring unit and is placed on the fingers of the tester. The switch is operated to cause the batteries to drive the motor, and hence the magnet, the register unit and the remote register unit. After a short time, the reading of the remote register unit is observed and compared with that of the register unit at the testing device. Equal readings of the two register units will indicate satisfactory connection and operation of the two register units and the connection between them. The entire test can be accomplished by one person in approximately five minutes.

An object of the present invention is to provide an apparatus for testing water meter register units, and the attendant connections to them. Another object is the provision of a tester for water meter registers which is portable, and can be used without connection to an external source of power. Yet another object of the present invention is to provide a water meter register tester which is battery operated, and which can vary the speed of operation of the tested units. Yet another object of the present invention is the provision of a water meter register tester which may be utilized with minimum modification, with register units of various sizes. Still another object of the present invention is to provide a water meter register tester which can be operated by only one person and which permits the testing to be accomplished in a very short time. Another object is to provide such a tester of extremely simple and economical construction which can be fabricated from commonly available components.

Other objects, and many attendant advantages of the present invention apparatus will be understood from consideration of the following specification and claims.

DESCRIPTION OF THE PREFERRED EMBODIMENT

Figure 1:
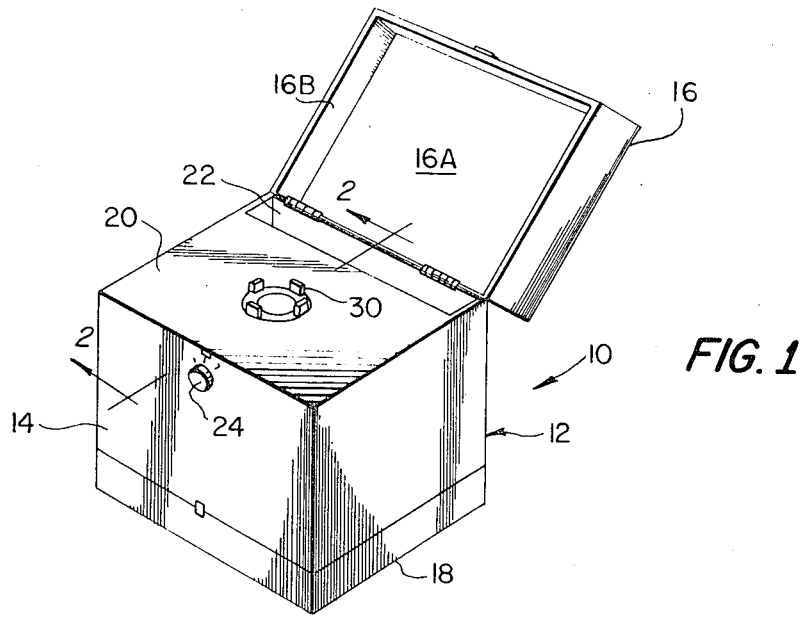
FIG. 1 is a testing device, shown in perspective view, in accordance with the present invention.

Referring now to the drawings, wherein like or corresponding reference numerals are used to designate like or corresponding parts throughout the several views, there is shown in FIG. 1 a perspective view of a testing device 10 in accordance with the present invention. Testing device 10 may be seen to comprise a generally boxlike housing 12 of approximately cubical configuration. Housing 12 comprises a relatively large middle portion 14, a top 16, shown in open position in FIG. 1, and a bottom 18. At the upper level of the middle portion 14 of the housing 12 there may be seen a partition 20, which extends generally horizontally and terminates short of the rear wall of the middle section 14, to thereby provide a storage compartment 22. As may be seen in FIG. 1, the top 16 is hinged to the middle section 14, and includes not only a planar top, designated 16A, but in addition includes the depending walls or flanges generally designated 16B. The bottom 18 is of similar shape and construction as the top 16, so that fabrication of the housing 12 is simplified.

Also shown on FIG. 1 is a control knob 24, and a plurality of supporting fingers 30, the construction and function of which will be described hereinbelow.

Figure 2:
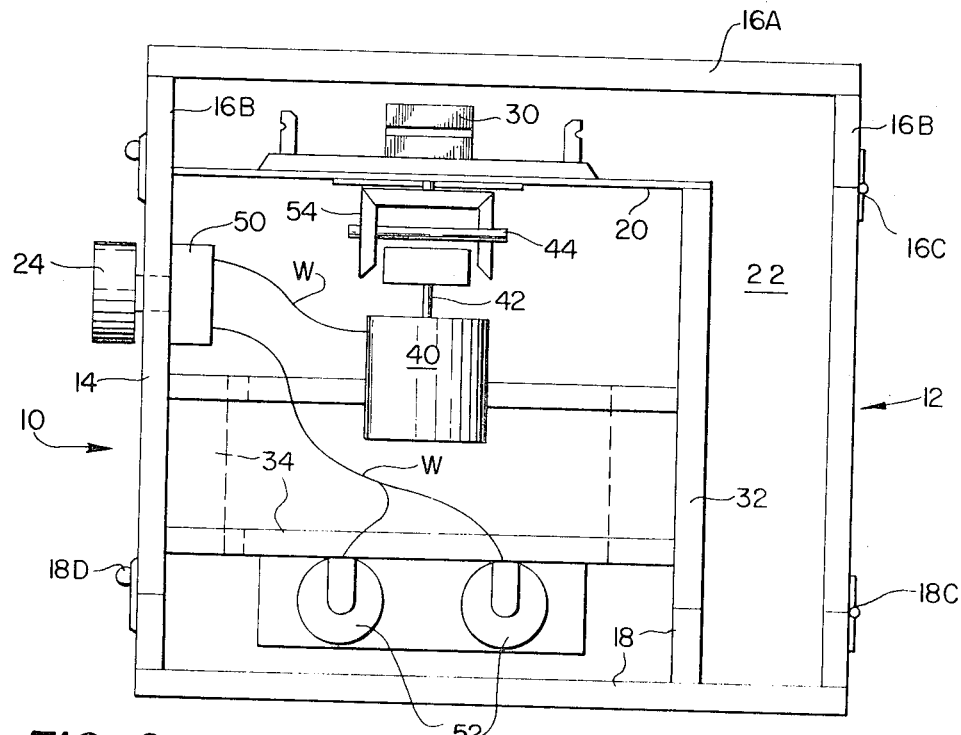
FIG. 2 is a cross-sectional view taken on the lines 2—2 of FIG. 1, with parts in an alternate position.

Referring now to FIG. 2, the top 16 and the bottom 18 are shown connected to the middle section 14 by hinges 16C and 18C respectively. In addition, conventional latch devices 16D and 18D are provided in order to secure the several parts of the housing 12 in closed condition.

Within the housing 12, there may be seen a vertically extending partition wall 32, which forms a portion of the boundary of the storage compartment 22. Partition wall 32 also provides a portion of the supporting structure generally designated 34, for an electric motor 40, which is conveniently mounted with its axis vertically extending. The motor 40 has a shaft 42, to the upper end of which there is connected a drive element 44, which is connected with shaft 42 and which extends generally transversely thereof. Mounted within the middle section 14 of the housing 12 is a switch 50, which is controlled by the aforementioned control knob 24. A pair of dry cell batteries 52 is mounted, in conventional manner, in the bottom portion of the housing 12, the batteries 52, switch 50 and electric motor 40 being interconnected by wiring W which is shown in FIG. 2; the specific circuitry provided by the wiring and the switch will be discussed hereinbelow in connection with FIG. 4.

Figure 3:
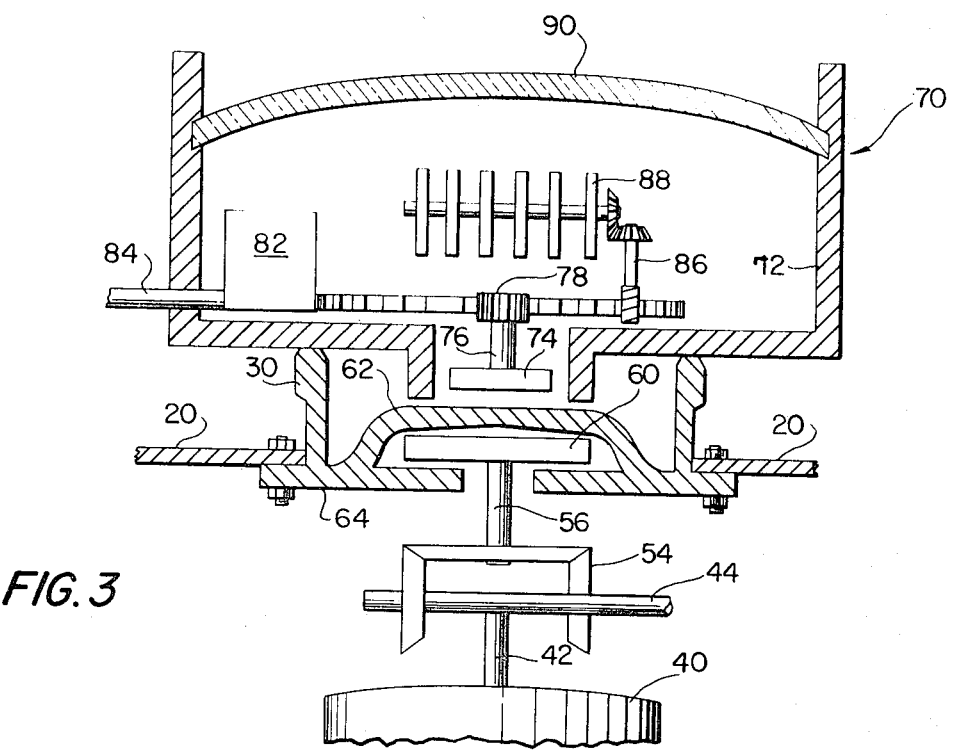
FIG. 3 is an enlarged cross-sectional view of a portion of the device as shown in FIG. 2, with a register unit in position.

The drive element 44 may be seen to be in operative engagement with a forklike coupling member 54. As is best shown in FIG. 3, to which reference is now made, the coupling member 54 is carried by a shaft 56, at the upper end of which is a magnet 60. Magnet 60 is carried within a hollow body 62 made of a material which will permit the passage of magnetic lines of force therethrough without significant change. The hollow body 62 is provided with an integral outstanding flange 64, by which it may be secured to the aforementioned horizontal partition 20. The supporting fingers 30 are preferably integral with the hollow body 62, there being four such fingers 30 provided, circumferentially arranged about the axis of the motor 40, and parallel thereto.

A register unit 70 of known construction may be mounted on the supporting fingers 30 and driven by the electric motor 40 and magnet 60. By way of illustration, register unit 70 may comprise a housing 72 having a magnet 74 therein. Magnet 74 may be carried by a shaft 76, having at the upper end thereof a gear 78. A transfer gear 80, in mesh with the gear 78, may drive a signal generator 82. The signal generator 82 has connected with it a conductor 84, conductor 84 also being connected to a remote register unit, not shown. By suitable gearing, generally designated 86, a disc-type readout device 88 may also be driven from the magnet 74. The readout device 88 may be observed through a suitable transparent covering 90.

Figure 4:
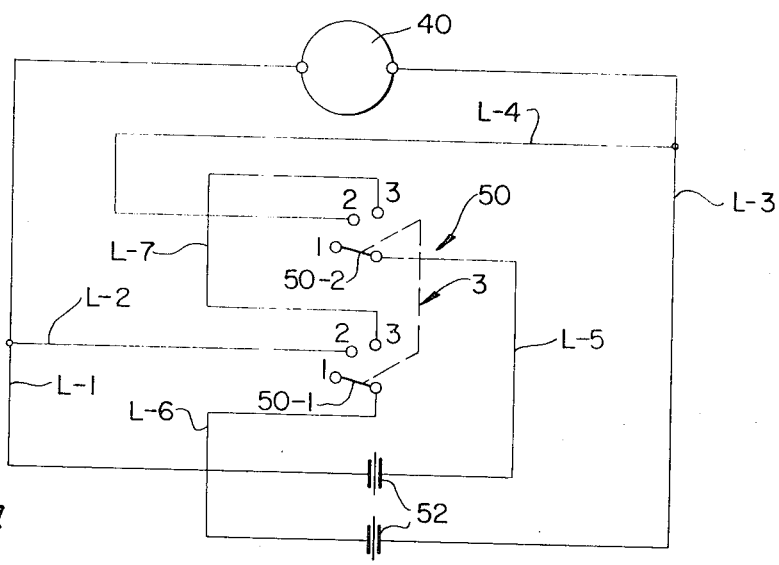
FIG. 4 is a circuit diagram of the electrical circuit included in the testing device of the present invention.

Referring now to FIG. 4, there may be seen the motor 40, the switch 50, which is a three-position switch, and the two batteries 52. When switch 50 is in the position shown, no current is supplied to the motor 40. When the switch 50 is moved to the intermediate position, the upper battery 52 will be seen to be connected by conductor L-1 directly to the motor 40, and the lower battery 52 will be connected through the contact 50-1 of switch 50 to conductor L-2, and to the motor 40. Conductor L-3 connects the motor 40 to the positive side of the lower battery 52, and conductor L-4 connects the upper contact 50-2, by means of conductor L-5, to the positive side of the upper battery 52. Thus, the two batteries 52 will be seen to be connected to motor 40 in parallel. Upon movement of the switch 50 to the third or uppermost position, the lower battery 52 will be connected through conductor L-6, lower contact 50-1, conductor L-7, upper contact 50-2, conductor L-5 to the positive side of the upper battery 52, the negative side of which will be connected with the motor 40 through conductor L-1; motor 40 will be connected with the positive side of lower battery 52 through conductor L-3, thereby providing a series connection of the two batteries 52 with the motor 40.

The above circuit will provide for speed control of the motor 40, and consequently of the magnet 60. Thus, register unit 70 may be driven at a given speed when the switch 50 is in the intermediate position, and at twice that speed when the switch 50 is in the upper position.

In use, water conduits are provided into a structure, and the water meter apparatus is installed, including the measuring chamber, the register unit, the remote register unit on the exterior of the structure, and the connection between the remote register unit and the register unit at the measuring chamber is made. The reading of the remote register unit is noted, and also the reading of the register unit at the measuring chamber. This register unit, which is the register unit 70 as shown in FIG. 3, is then disassembled from the measuring chamber, and is supported on the testing device 10, which will have the top 16 thereof open. The register unit 70 will be firmly held and supported by the testing device 10, including the supporting fingers 30. The switch 50 will then be actuated by the control knob 24, for example to the third position at which the highest speed of the motor 40 results. This speed of rotation causes the magnet 60 to be rotated, the speed thereof being much higher than the speed at which the driving magnet of the measuring chamber, connected to the impeller of the measuring chamber, would be rotated by a flow of water. After a short period of time, for example 3 minutes, the switch 50 is returned to the off position, and a comparison is then made between the readings provided by the register unit 70 and the remote register unit. If these readings have changed by the same amount, then proper operation and connection of the two register units is evidenced. The switch 50 can then be moved to the intermediate position, to give an intermediate rotational speed to the magnet 60, for a relatively brief period of time, for example one minute. At this point, the register unit 70 may be removed from the testing device 12, and reinstalled in association with the measuring chamber. The employee performing the work can then note the reading of the register unit 70, and carrying the testing device 12 with him, can again read the remote register unit as a final check. By utilizing this system of operation, as provided by the present invention testing device 12, a water meter installation can be checked and rechecked by a single employee in approximately 5 minutes.

In some water utilities, water meters of different manufacturers are often used, so that the register units thereof are of somewhat different sizes. Therefore, an adapter ring (not shown) is provided, which will be carried in the compartment 22, and which can be placed upon the supporting fingers 30 in order to support a register unit having a somewhat larger size than the register unit which fits upon the supporting fingers 30. Consequently, the testing device 10 is usable with water meters of various manufacturers, and of various sizes.

The testing device 10 as herein disclosed is of small size, preferably being a cubical construction of approximately 6 inches on each side. The device 10 can be readily fabricated, since the parts thereof, such as the motor 40, the switch 50 and the structure including the magnet 60 and the hollow body 62, are all readily available. The housing 12 may be fabricated from plastic, metal or wood, without difficulty and at low cost. The batteries 52 are standard dry cell batteries, and replacement thereof may be readily effected due to the construction of the housing 12 including the bottom 18 that is pivotally connected to the middle section 14.

It will be obvious to those skilled in the art that various changes may be made without departing from the spirit of the invention and therefore the invention is not limited to what is shown in the drawings and described in the specification but only as indicated in the appended claims.

We claim:

1. A testing device for testing magnetically driven register units comprising:
   housing means for supporting a register unit, said housing means comprising means for supporting a register unit,
   battery means and an electric motor electrically connected thereto within said housing means,
   a rotatable magnet within said housing means adjacent said register unit supporting means, and means for drivingly connecting said motor to said magnet.

2. The testing device of claim 1, and means for driving said magnet at a plurality of selected speeds.

3. The testing device of claim 2, said battery means comprising a pair of batteries, said means for driving said magnet at a plurality of selected speeds comprising switch means for connecting said batteries to said motor in series or in parallel.

4. The testing device of claim 1, said housing means comprising pivoted top means overlying said register unit supporting means.

5. The testing device of claim 1, said means for supporting a register unit comprising a plurality of fingers spaced circumferentially of the axis of said magnet and parallel thereto.

6. The testing device of claim 5, said housing means comprising a pivoted top means overlying said fingers and extending downwardly in surrounding relation thereto.

7. A testing device for testing magnetically driven register units comprising:
   a housing having a middle section and top and bottom sections,
   means movably connecting said top section and bottom section to said middle section,
   a partition at the top of said middle section,
   a hollow member supported by said partition and having a rotatable magnet therein, means within said housing for driving said magnet, and
   means extending from said hollow member for supporting a register unit above said partition.

8. The testing device of claim 7, said magnet driving means comprising a motor and electric battery means connected thereto, said motor being in said middle section and said battery means supported in said middle section and accessible upon movement of said bottom section.

* * * * *